United States Patent [19]

Temple

[11] 3,731,953

[45] May 8, 1973

[54] AUTOMATIC AIR HOSE CONNECTOR

[75] Inventor: Fred Temple, Pittsburgh, Pa.

[73] Assignee: Westinghouse Air Brake Company, Wilmerding, Pa.

[22] Filed: Sept. 9, 1971

[21] Appl. No.: 178,904

[52] U.S. Cl. ..........................285/12, 285/63, 285/73
[51] Int. Cl. ...............................................F16l 55/00
[58] Field of Search.......................285/12, 63, 24, 25, 285/26, 27, 28, 29, 305, 307, 317, 70, 71, 72, 73

[56] References Cited

UNITED STATES PATENTS

| | | | |
|---|---|---|---|
| 3,476,407 | 11/1969 | Temple et al. | 285/12 |
| 3,312,481 | 4/1967 | Temple | 285/12 |
| 3,477,743 | 11/1969 | Bartolomeo | 285/12 |
| 2,819,913 | 1/1958 | Kayler | 285/63 |
| 1,787,455 | 1/1931 | Robinson | 285/12 |
| 2,003,082 | 5/1935 | Kaiser et al. | 285/63 X |

*Primary Examiner*—Thomas F. Callaghan
*Attorney*—Ralph W. McIntire, Jr.

[57] ABSTRACT

This invention relates to an automatic air hose connector for use on railway cars. This hose connector has a mating head which is provided with a removable hose nipple that has a hose secured to one end and a hose coupling formed on the other. When two adjacent cars, each having an automatic air hose connector, are coupled, while the nipples remain secured to the mating heads, the gaskets carried in the end of each hose coupling are moved into abutting relationship one with the other to form a seal therebetween so that a continuous conduit extends from one car to the other. Prior to coupling a car having an automatic air hose connector to a car without such a connector, the hose nipple is removed from the mating head so that, subsequent to the coupling of the cars, the hose coupling formed on the end of the nipple can be manually coupled to the hose coupling on the end of the hose at the adjacent end of the car without an automatic air hose connector to thereby form a continuous conduit from one car to the other.

9 Claims, 3 Drawing Figures

INVENTOR.
FRED TEMPLE

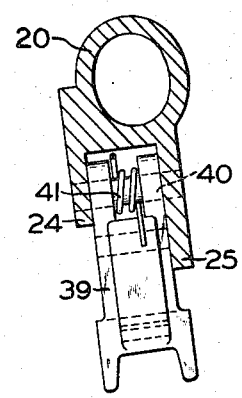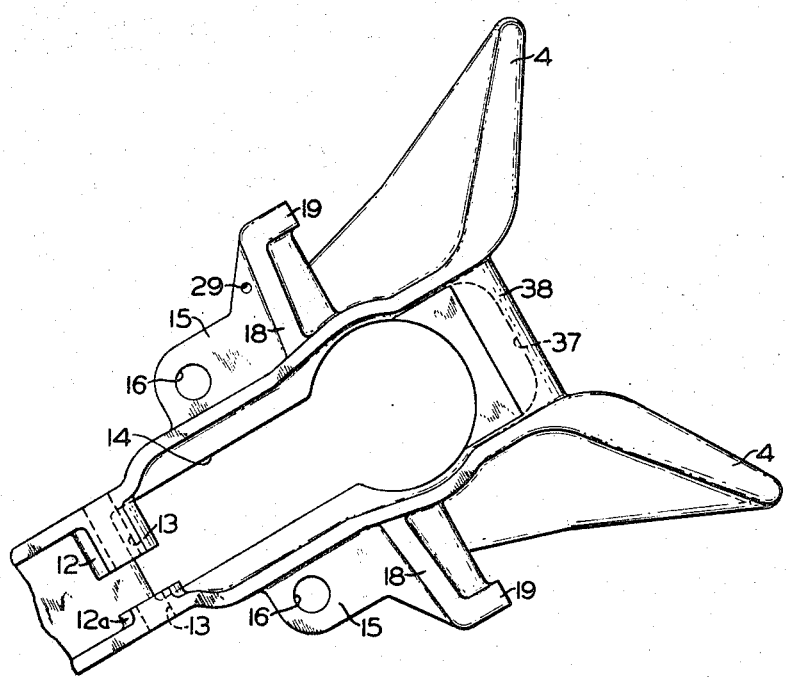

3,731,953

AUTOMATIC AIR HOSE CONNECTOR

BACKGROUND OF THE INVENTION

In U.S. Pat. No. 3,476,407, issued Nov. 4, 1969 to Fred Temple et al. and assigned to the assignee of the present invention, there is shown and described an automatic air hose connector that has one end of an air hose connected to a nipple carried by a mating head that can be manually removed from the lower end of a support member secured at its upper end to a car coupler. When the mating head is so removed from the support member, a hose coupling on the end of the hose at the adjacent end of a railway car not provided with an automatic air hose connector can be manually coupled to a hose coupling formed within the mating head thereby forming a continuous conduit from one car to the other. It has been found that a detached mating head is heavy and bulky. Therefore, considerable difficulty is experienced by a trainman in a maneuvering the detached mating head and connected hose into the proper position to enable him to connect thereto the hose coupling at the end of the hose on the adjacent end of the car that is not provided with an automatic air hose connector.

Accordingly, it is the general purpose of this invention to provide a railway car with an automatic air hose connector having a mating head that is provided with an easily removable hose nipple having a hose secured to one end and a hose coupling formed at the other to which, while removed from the head, the hose coupling on the end of the hose at the adjacent end of a car not provided with an automatic air coupler may be manually coupled to form a continuous conduit from one car to the other.

SUMMARY OF THE INVENTION

According to the present invention, the mating head of an automatic air hose connector for a railway car is provided with an opening for receiving therein a removable nipple that has a hose secured to one end and a hose coupling formed integral therewith at the other. Intermediate its ends, the nipple has formed integral therewith a lug that has a bore extending therethrough for receiving a removable pin, the opposite ends of which are disposed in coaxial bores formed in a pair of parallel spaced-apart support members integral with the mating head. Also integral with the nipple and also intermediate its ends is a pair of spaced-apart depending legs in which are disposed the opposite ends of a pin on which is rockably mounted a C-shaped guard arm which is biased by a torsion spring, while two cars having alike hose connectors are coupled, against a grooved cross member that extends between two guide wings integral with the connector head of the other hose connector, the lip of the hose coupling at the other end of the removable nipple carried by the other air hose connector being disposed in this groove while this nipple remains connected to its respective mating head. The cross member also serves as a guide surface for a third guide wing, which is removably mounted on a flange integral with the mating head of the air connector on the other car whereby the three guide wings on each mating head so guide the mating heads that the gaskets carried in the hose coupling at the adjacent ends of the nipples are brought into proper alignment to form an air-tight seal therebetween when the two cars are coupled.

When a car provided with an automatic air hose connector, from which the nipple has been detached, is coupled to a car without such a connector, and a trainman manually connects the hose coupling at the end of the detached nipple to the hose coupling on the end of the hose at the adjacent end of the car not having an automatic air hose connector, the C-shaped guard arm carried by the detached nipple is moved into locking engagement with the lip of the coupling at the end of the hose so that the gaskets carried by these two now locked hose couplings form an air-tight seal therebetween.

In the accompanying drawings:

FIG. 2 is a cross-sectional view, taken along the line 2—2 of FIG. 1 and looking in the direction of the arrows, showing the details of a pivoted guard arm.

FIG. 3 is a plan view of the mating head of an automatic air connector with a detachable hose nipple removed.

Figure 1:
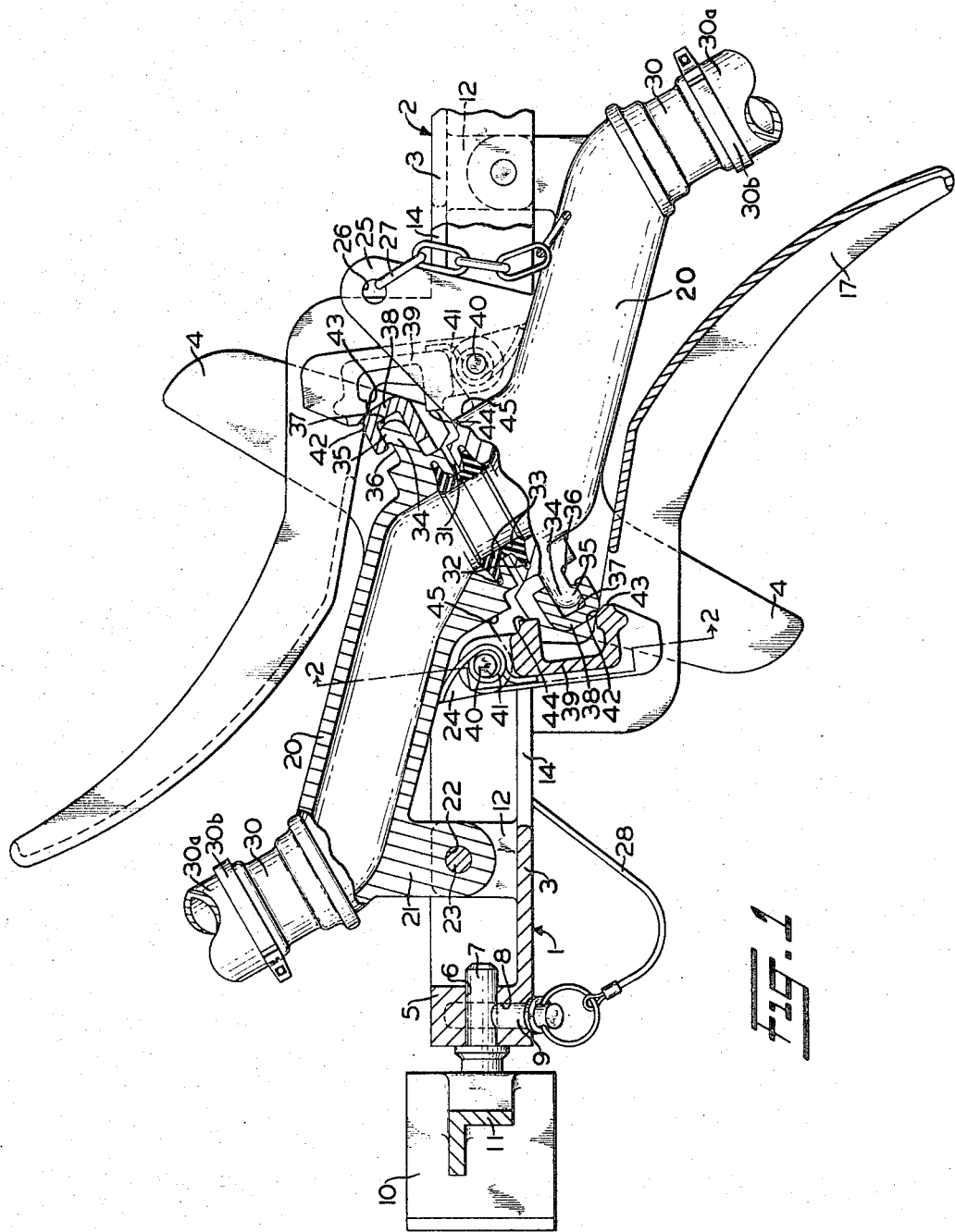
FIG. 1 is an elevational view, partly in section, of a pair of engaged automatic air hose connector mating heads embodying the invention.

FIG. 1 of the drawings shows a pair of automatic air hose connectors 1 and 2 in the position they occupy while two adjacent cars are coupled, it being understood that these connectors are secured to the car couplers at the adjacent ends of the two coupled railway cars in a manner hereinafter described. Since the two automatic air hose connectors are identical, a description of one will suffice for both. Consequently, the same reference numerals are used to denote the identical parts of each air hose connector.

Each automatic air hose connector comprises a mating head 3 which is in the form of a U-shaped channel member that at one end has formed integral therewith a pair of spaced-apart wing-like guide members 4 only one of which appears in FIG. 1, it being noted that both of these guide members 4 appear in FIG. 3. The opposite end of the U-shaped channel member is closed by a web 5 through which extends a bore 6 in which is received one end of a support pin 7. A tapered drilled hole 8 extends through the web 5 and a part of the support pin 7 for receiving a quick-disconnect tapered pin 9 which serves to normally lock the mating head 3 to the support pin 7. The opposite end of the support pin 7 has formed integral therewith a ball (not shown) which is embedded in a resilient cushion member (not shown) which is bonded to the ball. The contour of the outer surface of this cushion member conforms to the contour of the inner surface of a hollow casing portion 10 formed at the lower end of a hanger 11. The upper end (not shown) of the hanger 11 may be secured to a car coupler head (not shown) in the manner described in hereinbefore-mentioned U.S. Pat. No. 3,476,407, it being understood that the connection of the support pin 7 to the lower end of the hanger 11 is the same as that shown in this patent.

As shown in FIGS. 1 and 3 of the drawings, the opposite sides of the U-shaped channel member comprising the mating head 3 have formed integral therewith a pair of oppositely arranged and inwardly facing bosses 12 and 12a, only the boss 12 appearing in FIG. 1. Each of these bosses is provided with a bore 13 that is coaxial with the bore in the other boss.

As shown in FIGS. 1 and 3, the bottom of the U-shaped channel constituting the mating head 3 is provided with an opening 14. As best shown in FIG. 3, the left-hand end of this opening 14 is rectangular and the right-hand end is substantially circular.

As illustrated in FIG. 3, formed integral with each of the opposite sides of the U-shaped channel member and extending outward therefrom at an angle of 90° therewith is a flange 15, each of which is provided with a smooth bore 16. The purpose of these bores 16 is to receive a pair of bolts (not shown) by which a flange (not shown) formed at one end of a third wing-like guide member 17 (FIG. 1) is secured to the lower side of the flanges 15, it being understood that a nut is screw-threaded onto the threaded end of each of these bolts to force the flange on the end of the guide member 17 against the flanges 15 when these bolts are tightened.

As shown in FIG. 3, integral with each flange 15 and extending outward from one side thereof is an L-shaped stiffening rib 18, one purpose of which is to impart rigidity to a mating surface (not shown) formed on the lower side of the two flanges 15. One end of each L-shaped stiffening rib 18 is integral with one side of the U-shaped channel member and the other end, which is denoted by the reference numeral 19, serves as a stop for the other end of the corresponding stop on the other mating head when two mating heads are brought together during a car coupling operation.

As shown in FIG. 1, a removable hose nipple 20 is disposed between the parallel spaced-apart sides of the U-shaped channel member constituting each mating head 3. Formed integral with the hose nipple 20 intermediate the ends thereof is a lug 21 which is disposed between the bosses 12 and 12a. This lug 21 is provided with a bore 22. When this bore 22 is placed in coaxial alignment with the bores 13 in the bosses 12 and 12a, the hose nipple 20 may be removably secured to the mating head 3 by inserting a pin 23 through the bores 13 and 22.

As shown in FIG. 2, formed integral with the hose nipple 20 is a pair of parallel spaced-apart legs 24 and 25 for a purpose hereinafter made apparent. The leg 25 is longer than the leg 24 and, as shown in FIG. 1 for the hose nipple 20 of the automatic air hose connector 2, is provided with a bore 26 whereby one end of a chain 27 can be anchored to the leg 25. The chain 27 passes through the opening 14 and then extends upward so that its opposite end may be anchored to the hanger 11 intermediate the ends thereof, it being noted that this portion of the chain and hanger does not appear in the drawings. The length of the chain 27 is such as to prevent the hose nipple 20 from dragging on the ties of the railway road bed if, subsequent to withdrawal of the pin 23 and removal of the hose nipple 20 from the mating head 3 at one end of a railway car, this end of the car is not coupled to another car.

To prevent the loss of the pin 23, subsequent to removal of the hose nipple 20 from the mating head 3, one end (not shown) of a flexible wire cable or a chain 28 is secured to one end of the pin 23. This cable is passed through a bore 29 (FIG. 3) provided therefor in one of the flanges 15 of the mating head 3 and has its other end secured to the hereinbefore-mentioned quick-disconnect pin 9. Thus, this chain 28 serves the dual purpose of preventing the loss of pins 9 and 23 when either one of these pins is removed.

As shown in FIG. 1, one end of the hose nipple 20 is provided with a shank 30 to which one end of a piece of hose 30a is secured by a hose clamp 30b. The other end of the hose 30a is connected to the angle cock (not shown) that is secured to the end of the brake pipe at the corresponding end of the railway car.

Formed, as by machining, at the other end of the hose nipple 20 is a face 31 and a gasket groove 32 in which groove is disposed a resilient gasket 33 which may be identical to the usual hose coupling gasket carried in a groove provided therefor in a manual type hose coupling.

Also formed adjacent this other end of the hose nipple 20 is a lip 34 having a lip bead 35 and a lip bearing surface 36. The size and shape of this lip 34, lip bead 35 and lip bearing surface 36 is the same as that of a standard railway hose coupling to enable the hose nipple 20, when removed from the mating head 3, to be manually coupled to the hose coupling at the end of the hose on a railway car not provided with an automatic air hose connector when such a car is coupled to a car provided with an air hose connector embodying the present invention.

As shown in FIG. 1, when two cars, each of which is provided with an automatic air hose connector embodying the present invention, are coupled, the lip 34 and lip bead 35 of the hose nipple 20 carried by the mating head 3 of one air hose connector are disposed in a groove 37 formed in a C-shaped cross member 38 of this mating head 3, it being noted from FIG. 3 of the drawings that this member 38 extends between the two wing-like guide members 4 of this mating head 3 and is integral therewith.

As best shown in FIG. 2 of the drawings, disposed between the legs 24 and 25 is a guide arm 39 which, as can be seen from FIG. 1, is C-shaped. This guide arm 39 is rockably mounted on a pin 40, the opposite ends of which are anchored in coaxial bores provided therefore in the legs 24 and 25. Disposed about the pin 40 is a torsion spring 41 which, as best shown in FIG. 1, has one end bearing against the outside bottom surface of the nipple 20 and the other end bearing against the back side of the C-shaped guard arm 39 so that, when two cars, each provided with an automatic air hose connector constructed in accordance with the present invention, are coupled, this spring 41 is effective to bias a surface 42 on the guard arm 39 carried by the hose nipple 20 secured to the mating head 3 of one air hose connector against the outside surface of the cross member 38 of the mating head of the other air hose connector.

When a hose nipple 20 is removed from a mating head 3 and coupled to the hose coupling at the end of the hose of a car not provided with an automatic air connector, the torsion spring 41 is effective to bias a surface 43 on the guard arm 39 against the lip bearing surface of the hose coupling so that the hose gasket carried by this hose coupling and the hose gasket 33 carried by the hose nipple 20 are forced one toward the other to form a tight fluid pressure seal therebetween.

When two cars are uncoupled and one moved away from the other, the torsion spring 41 is effective to rock the guard arm 39 about the pin 40 until a surface 44 on this guard arm abuts a surface 45 on the hose nipple 20.

Assume that two railway cars, each of which is provided at each end thereof with an automatic air hose connector constituting the present invention, are to be coupled. Consequently, it may be assumed that one end of one of these cars is provided with the automatic air hose connector 1 shown in FIG. 1 and the adjacent end of the other car is provided with the automatic air hose connector 2. Prior to moving one car toward the other, the respective torsion spring 41 is effective to bias the surface 44 on the C-shaped guard arm 39 against the surface 45 on the hose nipple 20 carried by the mating head 3 of each of the automatic air hose connectors 1 and 2.

Further, assume that the automatic air hose connector 1 is carried by the car that is stationary and that the automatic air hose connector 1 is carried by the car that is being moved toward the stationary car to be coupled thereto. Consequently, as the moving car approaches the stationary car and just prior to striking it, the C-shaped cross member 38 on the mating head 3 of the automatic air hose connector 2 on the moving car will move into contact with the surface 43 on the C-shaped guard arm 39 carried by the automatic air hose connector 1 on the stationary car at substantially the same time as the surface 43 on the C-shaped guard arm 39 carried by the automatic air hose connector 2 on the moving car is moved into contact with the cross member 38 carried by the automatic air hose connector 1 on the stationary car. Therefore, as the automatic air hose connector 2 carried by the moving car moves toward the automatic air hose connector 1 mounted on the stationary car, each of the guard arms 39 will be rocked about the corresponding pin 40 against the yielding resistance of the respective torsion spring 41 until the two cars are coupled at which time the automatic air hose connectors 1 and 2 and the guard arms 39 carried thereon occupy the position shown in FIG. 1.

It may be noted that, when one car is moved away from the other, subsequent to uncoupling the couplers at the adjacent ends of two coupled cars, the torsion springs 41 bias the guard arms 39 into contact with the cross members 38 so that, first, the surface 42, and then the surface 43 slide along the outside surface of the C-shaped cross member 38 until the moving car has moved far enough away from the stationary car for the guard arms 39 to no longer contact these cross members 38 at which time each torsion spring 41 is effective to rock the corresponding guard arm 39 about its mounting pin 40 until the surface 44 on the respective guard arm 39 abuts the surface 45 on the corresponding hose nipple 20.

If it is desired to couple a car provided at each end with an automatic air hose connector constituting the present invention to a car not provided with automatic air hose connectors but having a standard hose and hose coupling secured to the end of the brake pipe at each end of this car, prior to coupling the cars, the hose nipple 20 carried by the mating head 3 of the automatic air hose connector at the end of the car that is to be coupled to the car not provided with an automatic air hose connector is removed from this mating head 3 by first removing pin 23 from the coaxial bores 13 and 22 and then withdrawing the hose nipple 20 from the mating head 3. It will be noted that, as hereinbefore stated, one end of the pin 23 is secured to one end of the cable or chain 28 that has its opposite end secured to the pin 9 that locks the mating head 3 to the support 7. Consequently, the pin 23 cannot fall to the ground and be lost.

Likewise, when the hose nipple 20 is withdrawn from the mating head 3, the chain 27 prevents this nipple from falling to the ground.

Subsequent to coupling of the car couplers at the adjacent ends of the two cars, the end of the hose nipple 20 carrying the hose gasket 33 and having the lip 34 and guard arm 39 can be manually coupled by a trainman to the hose coupling on the end of the hose at the adjacent end of the car not provided with an automatic air hose connector.

Having now described the invention, what I claim as new and desire to secure by Letters Patent, is:

1. An automatic air hose connector for a railway car having at each end an automatic car coupler head and an air hose connectable respectively to an automatic car coupler head and an air hose at the adjacent end of another railway car, said automatic air hose connector comprising, in combination:
   a. mounting means securable to the coupler head,
   b. a mating head removably secured at one end to said mounting means and having integral therewith at its opposite end a pair of spaced-apart wing-like guide members, wherein the improvement comprises,
   c. a cross member connecting said pair of spaced-apart guide members and having a groove therein,
   d. a hose nipple removably mounted intermediate its ends on said mating head, said nipple having at one end a shank for receiving thereon one end of a piece of hose and at the other end an internal groove and a lip conforming in configuration to the gasket groove and lip of a standard hose coupling, said lip being disposed in said groove in said cross member while said hose nipple is mounted on said mating head, and, while removed from said mating head, enabling said other end of said nipple to be manually coupled to a standard hose coupling, and
   e. means for removably securing said hose nipple to said mating head.

2. An automatic air hose connector for a railway car, as claimed in claim 1, further characterized by a guard arm pivotally mounted on said removable hose nipple, and by biasing means for biasing said guard arm in one direction, said guard arm being rockable in an opposite direction against the yielding resistance of said biasing means upon engagement by said cross member of a mating head on an adjacent car while coupling two cars to prevent locking engagement of said guard arm with the lip at the other end of the removable nipple mounted on the mating head of said adjacent car, said biasing means being effective, while said nipple is removed from said mating head, to bias said guard arm into locking engagement with the lip of a standard hose coupling upon effecting manual coupling of said other end of said removed hose nipple and the standard hose coupling subsequent to coupling two adjacent cars, only one of which is provided with an automatic air connector.

3. An automatic air hose connector for a railway car, as claimed in claim 1, further characterized in that said mating head comprises a U-shaped channel member between the parallel spaced-apart sides of which is provided an opening at one end of which is said cross member having a groove therein and at the opposite end of which is a pair of inwardly facing spaced-apart bosses, each integral with one of said parallel spaced-apart sides.

4. An automatic air hose connector for a railway car, as claimed in claim 1, further characterized in that said removable hose nipple is provided with a lug integral therewith and having an opening therein for receiving said means for removably connecting said hose nipple to said mating head.

5. An automatic air hose connector for a railway car, as claimed in claim 2, further characterized in that said removable hose nipple is provided with a lug integral therewith and having an opening therein for receiving said means for removably securing said hose nipple to said mating head and with a pair of parallel spaced-apart legs, and that said guard arm is disposed between and rockably mounted on said pair of legs.

6. An automatic air hose connector for a railway car, as claimed in claim 1, further characterized in that said mating head is provided with a securing flange integral therewith, and a third wing-like guide member is removably secured to said flange.

7. An automatic air hose connector for a railway car, as claimed in claim 1, further characterized in that said mating head comprises a U-shaped channel member, the parallel spaced-apart sides of which each have formed integral therewith an outwardly extending flange, and a third wing-like guide member is removably secured to said flanges.

8. An automatic air hose connector for a railway car, as claimed in claim 2, further characterized in that said guide arm is C-shaped, one end of which has formed thereon a pair of flat surfaces forming an obtuse angle therebetween, one of said flat surfaces engaging said cross member of a mating head on an adjacent car while two cars, each provided with an automatic air hose coupler, are coupled, and the other of said flat surfaces engaging said lip of a standard hose coupling upon effecting manual coupling of said other end of said removed hose nipple and the standard hose coupling.

9. An automatic air hose connector for a railway car, as claimed in claim 6, further characterized in that one of said parallel spaced-apart legs is longer than the other and is provided with an opening for receiving one end of a flexible support member for supporting said hose nipple while removed from said mating head.

* * * * *